United States Patent [19]
Jackson

[11] Patent Number: 5,855,262
[45] Date of Patent: Jan. 5, 1999

[54] VEHICLE EXTERNAL ELECTRIC SUPPLY SYSTEM

[76] Inventor: Michael D. Jackson, 101 Harvard Dr., Gillette, Wyo. 82716

[21] Appl. No.: 825,632

[22] Filed: Mar. 31, 1997

Related U.S. Application Data

[60] Provisional application No. 60/014,551, Apr. 3, 1996.

[51] Int. Cl.$^6$ ................................................ H02G 11/02
[52] U.S. Cl. .................. 191/12.4; 242/378.1; 242/396.4
[58] Field of Search .......................... 191/12.2 R, 12.4; 242/378.1, 388.1, 396.2, 396.4, 403, 405

[56] References Cited

U.S. PATENT DOCUMENTS

| | | | |
|---|---|---|---|
| 3,808,382 | 4/1974 | Blanch et al. | 191/12.2 R |
| 3,813,501 | 5/1974 | Meletti et al. | 191/12.2 R |
| 3,826,879 | 7/1974 | Penn et al. | 191/12.4 |
| 3,959,608 | 5/1976 | Finlayson et al. | 191/12.2 R |
| 4,103,844 | 8/1978 | Deinert et al. | 242/107 |
| 4,141,438 | 2/1979 | Diem | 191/12.4 |
| 4,282,954 | 8/1981 | Hill | 191/12.4 |
| 4,322,045 | 3/1982 | Tellier | 242/388.1 |
| 4,350,850 | 9/1982 | Kovacik et al. | 191/12.2 R |
| 4,384,688 | 5/1983 | Smith | 242/107.7 |
| 4,467,979 | 8/1984 | Koehler | 191/12.4 |
| 4,538,134 | 8/1985 | Carey | 337/113 |
| 4,570,145 | 2/1986 | Carey | 337/113 |
| 4,653,833 | 3/1987 | Czubernat et al. | 191/12.4 |
| 4,842,108 | 6/1989 | Anderson et al. | 191/12.2 A |
| 4,904,205 | 2/1990 | Rice | 191/12.4 |
| 5,056,698 | 10/1991 | Kozakevich | 191/12.2 R |
| 5,101,082 | 3/1992 | Simmons et al. | 191/12.2 R |
| 5,255,767 | 10/1993 | Norwood | 191/12.2 R |
| 5,320,560 | 6/1994 | Fladung | 439/490 |
| 5,342,993 | 8/1994 | Siems | 174/48 |
| 5,361,879 | 11/1994 | Lin | 191/12.4 |
| 5,453,585 | 9/1995 | Lenz et al. | 191/12.2 R |

FOREIGN PATENT DOCUMENTS

| | | |
|---|---|---|
| 2633786 | 3/1988 | France . |
| 2444807 | 4/1976 | Germany . |

OTHER PUBLICATIONS

"Thermo Cube" (R) plug package by Mastermotive, Inc. (pat applied for indicated). Uncertain publication date considered at present to be prior to the applicant's priority date.

Primary Examiner—S. Joseph Morano
Attorney, Agent, or Firm—Santangelo Law Offices, P.C.

[57] ABSTRACT

A retractable external vehicle electric system includes a cord holder to be mounted inside a car's engine compartment, including a two-piece case, a spool rotatably disposed within the case for retractably holding a first electric cord, a reel shaft securing together the case and serving as the axis about which the spool rotates, a spring wrapped about the shaft for automatically retracting the first electric cord once it is pulled away from the spool, structure for connecting two electric cords together, and an automatic, temperature responsive switch for allowing electricity to flow from the first electric cord to a second electric cord when a car's engine compartment has an ambient temperature less than a predetermined temperature set within the switch, so that when electricity is permitted to flow to the second electric cord, it is capable of functioning as an electrical outlet.

19 Claims, 7 Drawing Sheets

VEHICLE EXTERNAL ELECTRIC SUPPLY SYSTEM

This application claims the benefit of U.S. provisional application Ser. No.60/014,551, filed on Apr. 3, 1996.

BACKGROUND OF THE INVENTION

The present invention relates to external electric supplies for vehicles and more particularly to retractable electric cord holder devices configured to be mounted inside a car's engine compartment, or on other mobile equipment to facilitate heating and other purposes.

It is often desirable to have a convenient means of supplying electricity in conjunction with one's automobile, recreational vehicle, or any other type of mobile equipment. This is especially true of diesel-powered automobiles which need to be warmed up once the weather cools down. In order to warm up these engines, one end of a 120 volt extension cord is plugged into the nearest electrical outlet and the other end is plugged into the engine heater. Since it is not convenient to have an extension cord at hand, attempts have been made to configure an electric cord holder which would adapt to one's car.

Examples of these attempts include U.S. Pat. Nos. 5,056,698 issued Oct. 15, 1991, to Bernie Kozakevich; and 5,255,767 issued Oct. 26, 1993, to Wade K. D. Norwood. However, these attempts are not designed specifically to facilitate an engine heater and do not provide for automatic rewinding of the extension cord once the user is through. Furthermore, these attempt to not provide an automatic means for allowing electricity to flow into the extension cord once the ambient temperature within the engine compartment decreases to a predetermined range.

Even though not directly related to supplying 120 volt or other such line voltage source of electricity to a vehicle, these references do disclose a retractable booster cables device which is mounted inside a car's engine department. An example of this is seen in U.S. Pat. No. 4,904,205 issued Feb. 27, 1996, to Mark D. Rice. However, Rice discloses a unique coupling system for the booster cables in conjunction with concentric conductive rings where in the entire device functions in order to safely recharge a nearby battery. Rice does not disclose or suggest a plastic spool which retractably holds a 120 volt electric cord which automatically serves to provide electricity once the ambient temperature reaches below a certain range and does not address facilitating an engine compartment heater.

Similar to the Rice patent is U.S. Pat. No. 4,653,833 issued Mar. 31, 1987, to Czubemat et al. However, Czubernat et al. discloses a manually retractable set of booster cables which is not mounted inside a car's engine department, but rather is designed to be a portable device. Other examples of references which related to the field of batteries and battery recharging include German Patent No. 24 44 807 issued Apr. 1, 1976, to Robert Bosch GmbH and French Patent Publication No. 2 633 786, relative to the inventor George Leblanc, published Jan. 5, 1990.

References which address portable cord holders include U.S. Pat. Nos. 4,282,954 issued Aug. 11, 1981, to John O. Hill; 4,322,045 issued Mar. 30, 1982, to Roger J. Tellier; and 4,467,979 issued Aug. 28, 1984, to Rudolph A Koehler. However, each of these patents does not suggest a mounted cord holder in which the electric cord is automatically retracted into the holder once the user is through unplugging the electric cord from a nearby electrical outlet and do not address the needs which result from facilitation of an engine compartment heater application.

None of the above inventions and patents, taken either singly or in combination, describe the instant invention. Thus a retractable electric cord holder device solving the aforementioned problems is desired.

SUMMARY OF TIE INVENTION

In the present invention, a variety of embodiments involve a retractable electric cord holder device to be mounted inside a car's engine compartment. These may comprise a casing for retractably containing an electric cord, a reel shaft securing together the casing, a plastic reel including a plate secured to the shaft and a collector spool protruding from the plate, a cord being wrapped about the spool, and a spring wrapped about the shaft for biasing the shaft in a direction which keeps the cord wrapped about the spool, whereby the cord can be retractably pulled and plugged into an electrical outlet in order to provide electricity to any apparatus requiring 120 volts or the like. The electric cord holder device can further comprises a dust bushing, a weep hole, and a power indicator light. The cord holder optionally comprises an automatic means for allowing electricity to flow through the electric cord when the car's engine compartment has an ambient temperature less than a predetermined temperature set within the automatic means, as well as a set of plug adapters.

Accordingly, it is a principal object of the invention to provide a means for automatically allowing electricity to flow into the cord holder device thereby allowing the cord holder device to function as an electrical outlet.

It is another object of the invention to provide an automatically retractable electric cord holder device once the user is through plugging the electric cord into an electrical outlet.

It is a further object of the invention to provide a convenient means of heating one's engine compartment.

Still another object of the invention is to provide a ready supply of 120 volt or other power electricity in conjunction with one's mobile equipment such that a user may enable portable appliances.

It is a further object of the invention to clean the electric cord as it is automatically rewinds.

It is an object of the invention to provide improved elements and arrangements thereof in an apparatus for the purposes described which is inexpensive, dependable and fully effective in accomplishing its, intended purposes.

These and other objects of the present invention are presented in the specification and claims and will become apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

As can be easily understood, the basic concepts of the present invention may be embodied in a variety of ways. It involves both supply techniques as well as devices to accomplish the appropriate goals. In this application, the supply techniques are disclosed as part of the results shown to be or implicitly achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

Figure 1:
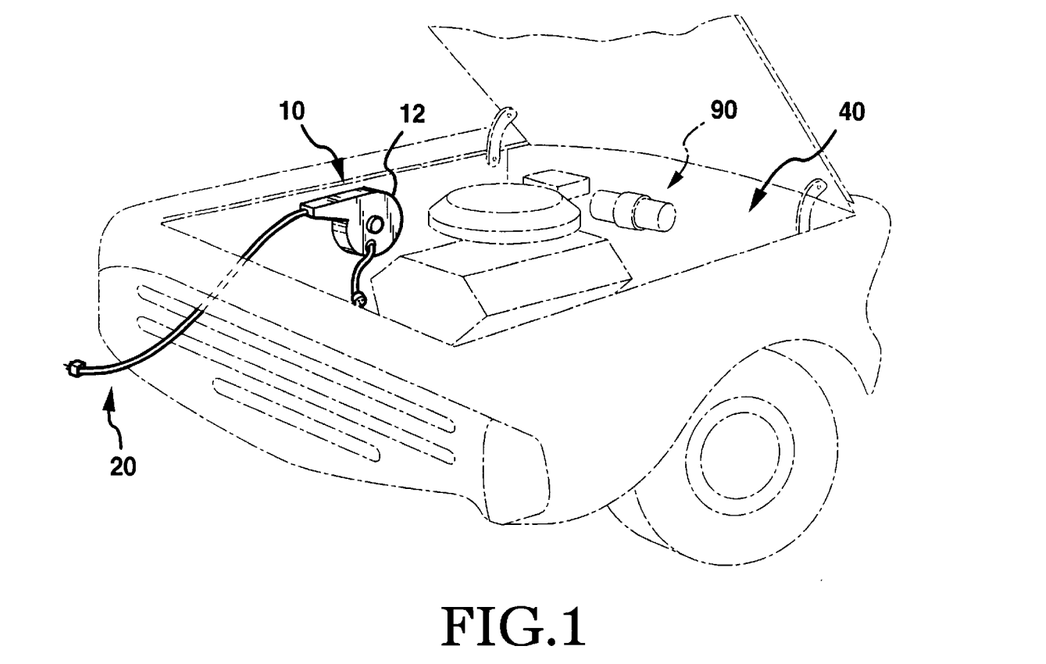
FIG. 1 is an environmental, perspective view of a retractable electric cord holder device according to one embodiment of the present invention showing the holder device mounted inside a car's engine compartment.
Figure 2:
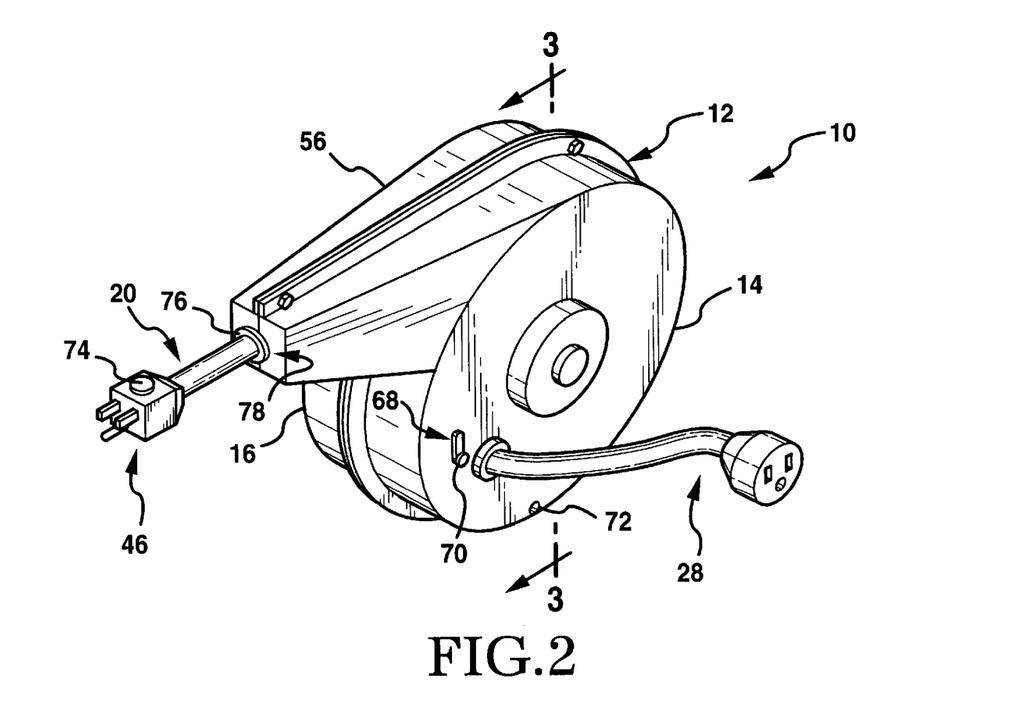
FIG. 2 is a perspective side view of the retractable electric cord holder device as show in FIG. 1, and drawn to an enlarged scale.
Figure 3:
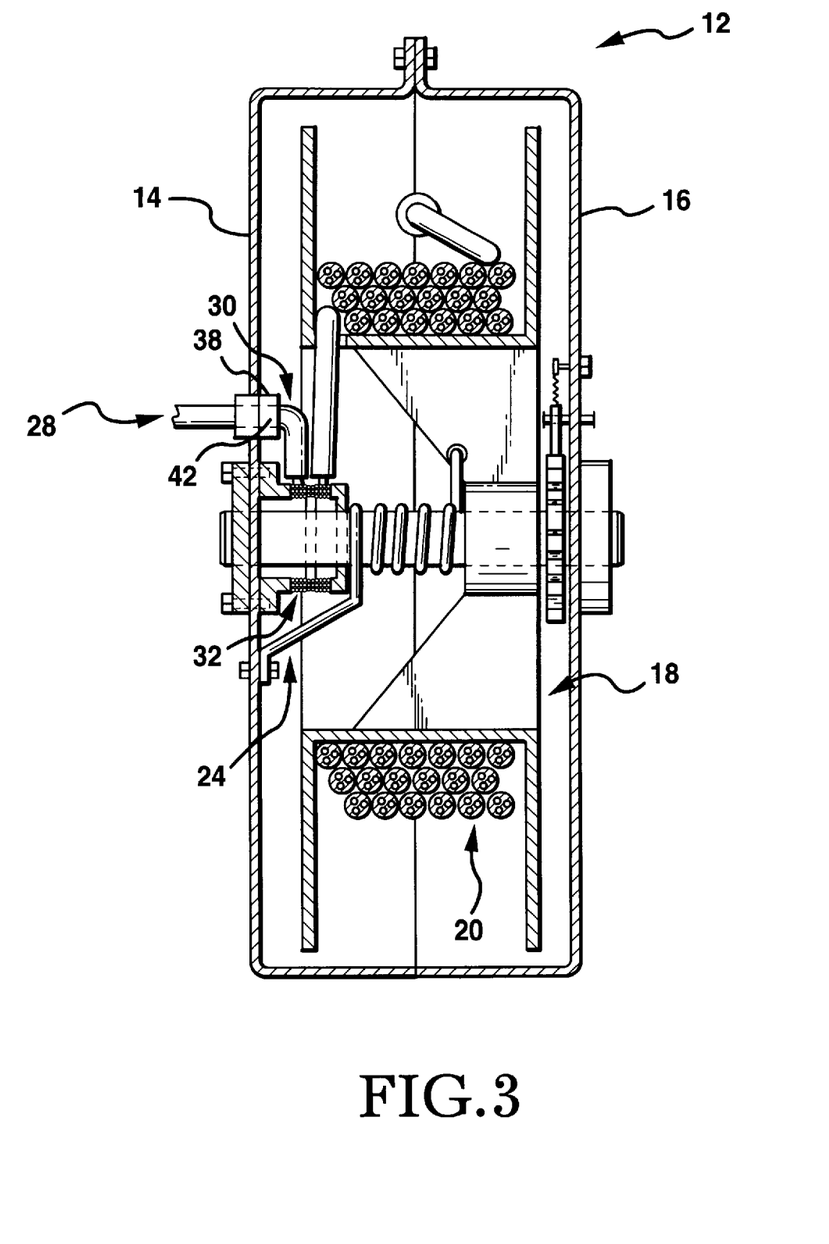
FIG. 3 is a cut-away view drawn along lines 3—3 of FIG. 2 of the retractable electric cord holder device according to one embodiment of the present invention.

As depicted in the figures, especially FIGS. 1–3, embodiments of the present invention relate to a retractable electric cord holder device 10 to be mounted inside a car's engine compartment 40 including a case 12 having first and second members 14, 16, a spool 18 rotatably disposed within the case 12 for retractably holding a first electric cord 20. The embodiment shown in FIGS. 1–3 shows a reel shaft 22 securing together the first and second members 14, 16. In all, the reel shaft 22 can serve as the axis about which the spool 18 rotates. A spring 24 may be wrapped about the shaft 22 for automatically retracting the first electric cord 20 back onto the spool 18. The designs may also include an automatic switch 26 which allows electricity to flow from the first electric cord 20 to a second electric cord 28 when a car's engine compartment 40 wherein the holder device 10 is mounted has an ambient temperature less than a predetermined temperature set within the automatic switch 26, such that when the electricity is permitted to flow to the second electric cord 28 by a connecting a means for transferring electricity, most generally an electrical transfer device 30 from the first electric cord 20 to the second electric cord 28, the second electric cord 28 is capable of functioning as an electrical outlet.

Figure 4:
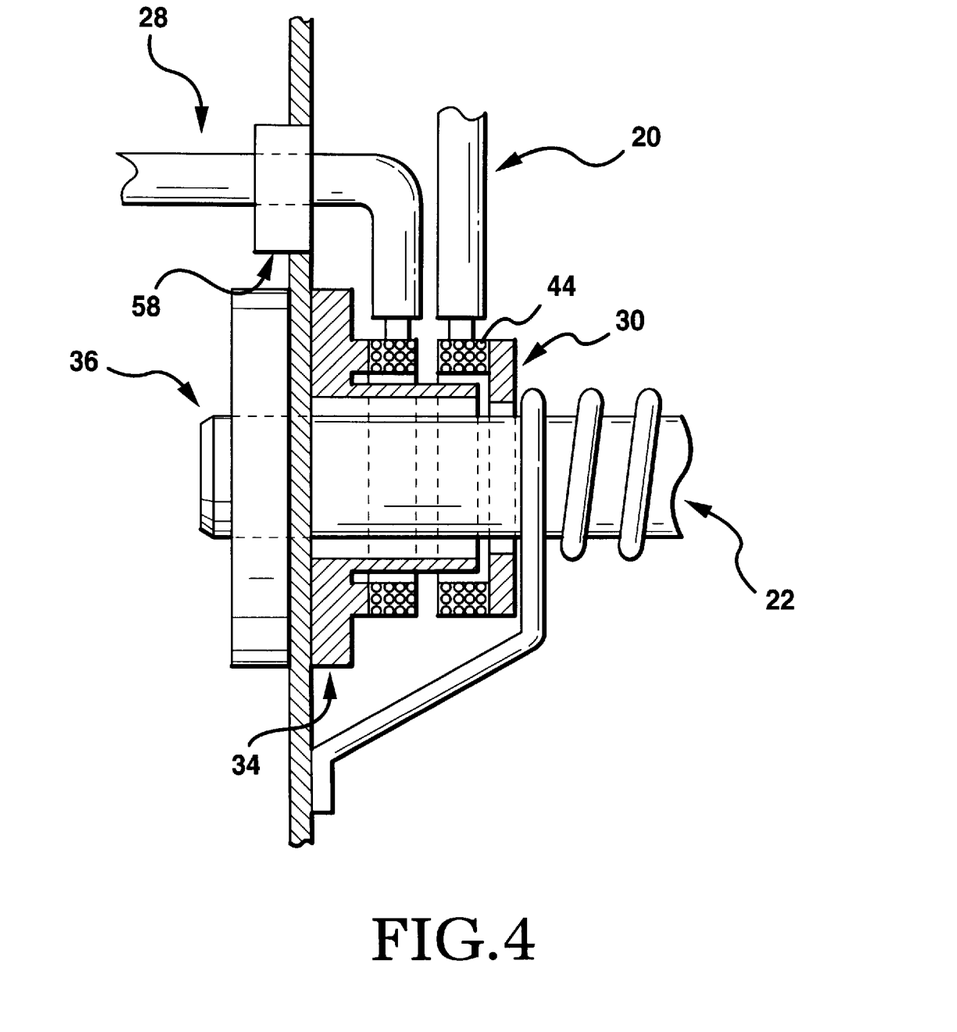
FIG. 4 is a fragmentary view of the connecting assembly for transferring electricity from one electric cord to another within the retractable electric cord holder device according to one embodiment of the present invention.

With respect to the connector 30 in the embodiment of the invention as depicted in FIG. 3, conductive brushes 32 protruding from the spool 18 constantly transfer electricity to a rotating bearing assembly 34 proximate the anchored end 36 of the shaft 22. The conductive brushes 32 may be made of brass or other conductive material wherein the bearing assembly 34 transfers electricity from the first electric cord 20 to the second electric cord 28 through a plastic housing 38 mounted to one of the first and second casing members 14, 16, the housing 38 (which may be plastic) may have electric contacts 42 made of brass or other conductive material. Other connectors 30 which transfers electricity also include magnetic induction in which the shaft 22 rotates about a magnetic coil 44 (FIG. 4), as well as having a cooperative pair of sliding rings (not shown) which are in constant contact with one another as the shaft 22 rotates.

Figure 5:
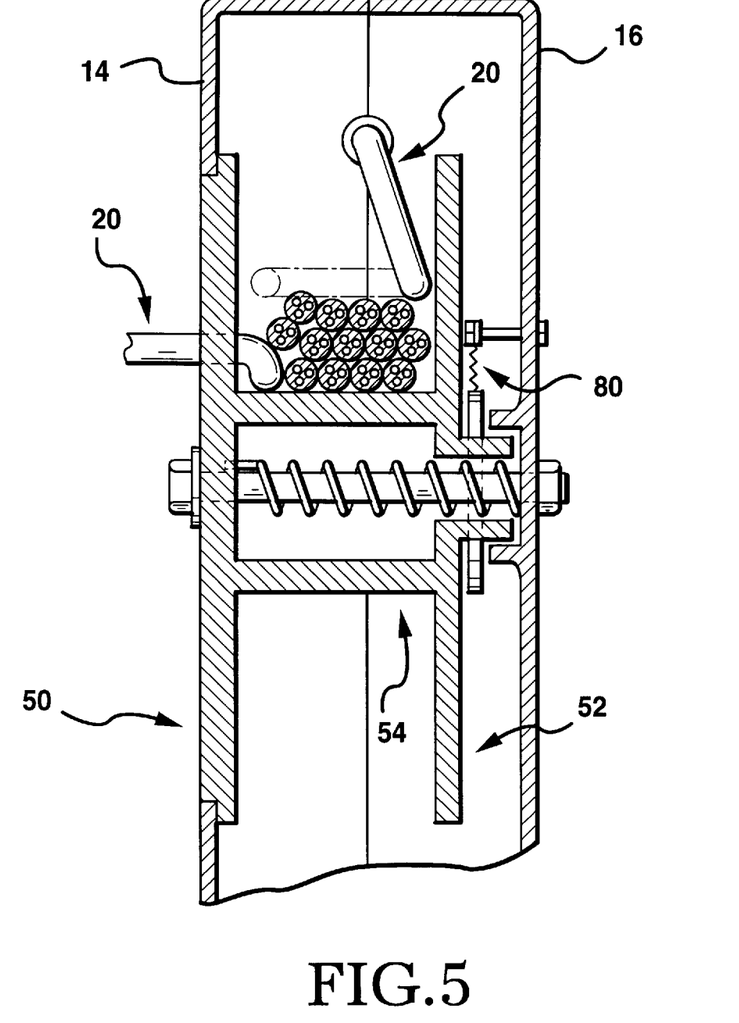
FIG. 5 is a cut-away view drawn along lines 3—3 of FIG. 2 of the retractable electric cord holder device according to one embodiment of the present invention.
Figure 6:
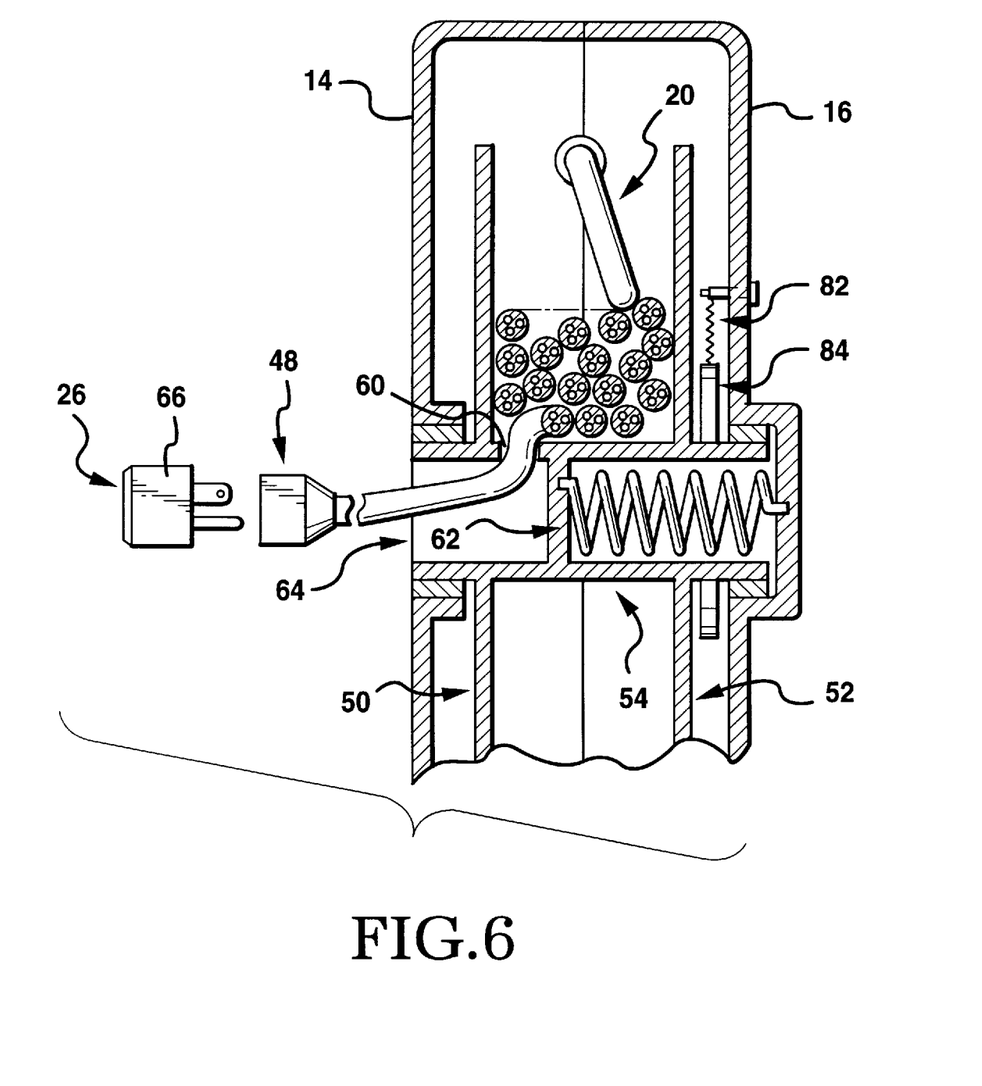
FIG. 6 is a cut-away view drawn along liens 3—3 of FIG. 2 of the retractable electric cord holder device according to one embodiment of the present invention.

Alternatively, as depicted in FIGS. 5 and 6, another connector 30 which transfers electricity embodied by the present invention has only one electric cord 20 having a male end 46 and a female end 48. As shown in FIG. 5, the spool 18 can comprise a pair of opposing plates 50, 52 and a collector spool 54 protruding from each of said plates 50, 52 which may connect the plates 50, 52 together. One of the opposing plates 50, 52 can act as a side wall of the case 12 wherein the user merely pulls the male end 46 of the cord 20 through a neck region 56 of the holder device 10 and plugs it into an outlet, while allowing the female end 48 to freely rotate about a hole 58 placed into one of the plates 50, 52. In another embodiment as shown in FIG. 6, the male end 46 of the cord 20 is pulled through the neck region 56 of the holder device 10 and plugged into an outlet, while allowing the female end 48 to rotate freely within a hollow shaft 22 rotatable about a hole 60 placed through the shaft 22, said shaft 22 having a partition 62 wherein a spring 24 may bias the spool 18 in a direction in which the electric cord 20 is forced to rewind about the spool 18, and wherein the female end 48 can exit a hole 64 centrally located about one of the first and second casing members 14, 16 where the shaft 22 is rotatably secured.

In the embodiment of the invention as depicted in FIG. 2, the automatic switch 26 which allows electricity to flow through the electric cords 20, 28 when the car's engine compartment 40 has an ambient temperature less than a predetermined temperature, is detachable wherein a bimetallic switch 66 contracts when at a certain temperature to form a completed electrical circuit.

In the embodiment of the invention as depicted in FIG. 3, the automatic switch 26 which allows electricity to flow through the electric cords 20, 28 when the car's engine compartment 40 has an ambient temperature less than a predetermined temperature, is fixed to one of said first and second casing members 14, 16 wherein the bimetallic switch 66 is integrated into the plastic housing 34. Alternatively, the automatic switch 26 can be comprised of a lever means (not shown) connected to a thermometer (not shown) which moves when at a certain temperature in order to form a completed electrical circuit. In the embodiment as depicted in FIG. 3, a manual switch 68 which allows (not entirely shown) electricity to flow from said first electric cord 20 to said second electric cord 28 when said engine compartment 40 has an ambient temperature greater than said predetermined temperature can be included in order to achieve free flowing electricity to the second cord 28, whereby the second electric cord 28 is capable of functioning as an electrical outlet. The manual switch 68 can comprise a lever 70 manipulatable from outside the case 12. As such, whenever a user wanted to power an electrically-driven device and the temperature was above the predetermined temperature set within the automatic switch 26, the user merely would have to move the lever 70 extending outside the case 12.

In all embodiments of the invention, the case 12 can have a top and a bottom portion, wherein the bottom portion may have a weep hole 72. This weep hole 72 allows for any drainage of liquid trapped within the case 1 as shown in FIG. 2. Furthermore, all embodiments of the invention can have a power indicator light 74 located proximate the male end 46 of the electric cord 20, as shown in FIG. 2. Also shown in FIG. 2, all embodiments of the invention can include a dust bushing 76 surrounding an opening 78 formed by the neck region 56 protruding from the annular shaped or other shaped case 12. This dust bushing 76 can automatically wipe excess dirt and moisture off the electric cord 20 as it passes through the opening 78 at the end of the neck region 56.

Figure 7:
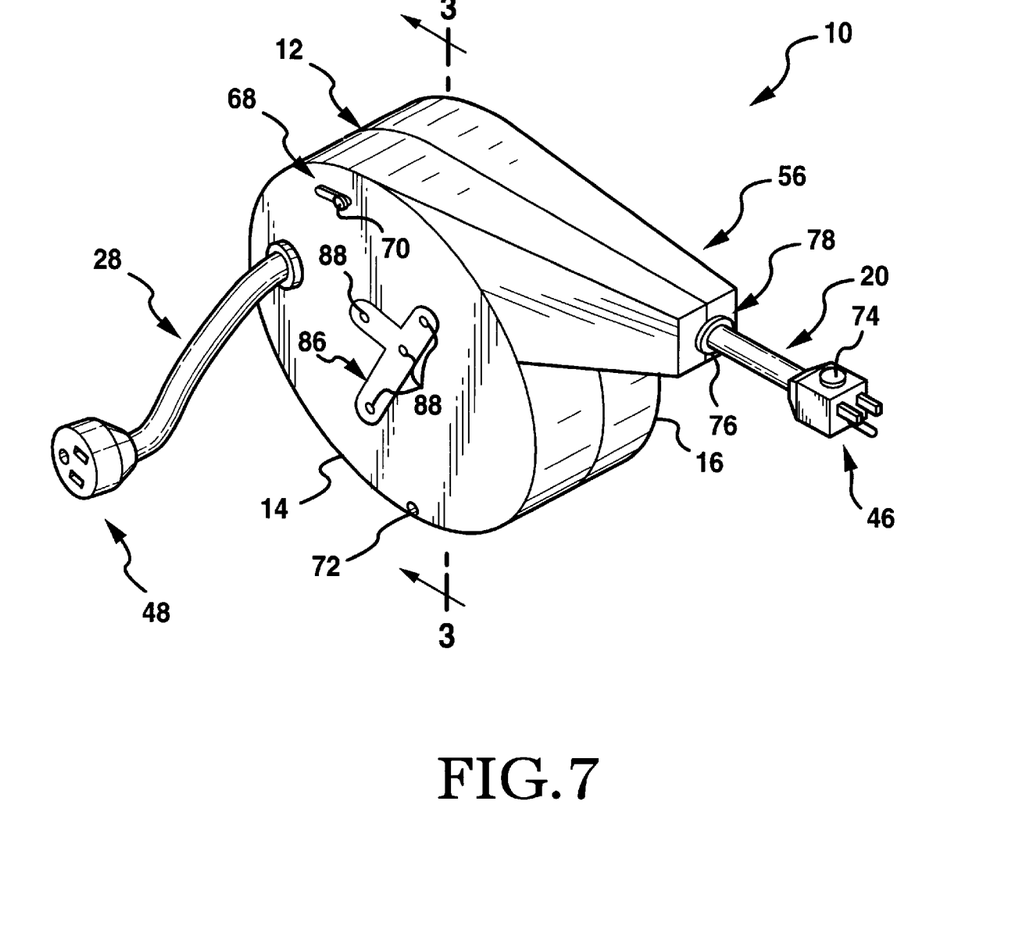
FIG. 7 is a perspective side view of an alternative embodiment of a retractable electric cord holder device.
Figure 8:
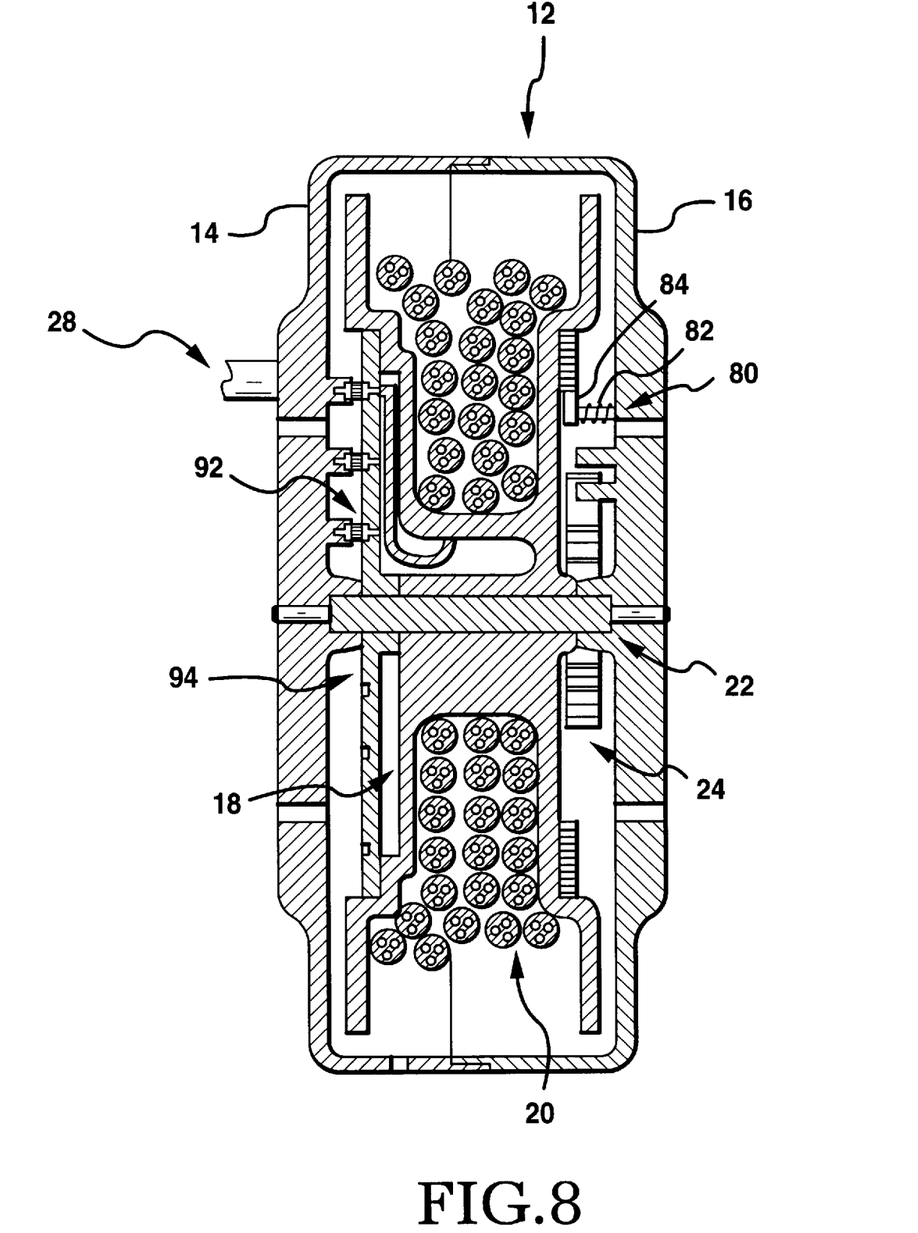
FIG. 8 is a cut-way view drawn along lines 3—3 of FIG. 7 of the retractable electric cord holder device according to one embodiment of the present invention.

As depicted in FIGS. 7 and 8, one embodiment of the present invention relates to a retractable electric cord holder device 10 to be mounted inside a car's engine compartment 40 including a case 12 having first and second members 14, 16. This embodiment may include any of the following: a spool 18 rotatably disposed within the case 12 for retractably holding a first electric cord 20, a reel shaft 22 securing together the first and second members 14, 16 and serving as the axis about which the spool 18 rotates, a spring 24 wrapped about the shaft 22 for automatically retracting the first electric cord 20 back onto the spool 18, an automatic switch (not shown) which allows electricity to flow from the first electric cord 20 to a second electric cord 28 when a car's engine compartment 40 wherein the holder device 10 is mounted has an ambient temperature less than a predetermined temperature set within the manual switch 68, such that when the electricity is permitted to flow to the second electric cord 28 by a connector 30 from the first electric cord 20 to the second electric cord 28, the second electric cord 28 is capable of functioning as an electrical outlet.

With respect to the connector 30 in the embodiment of the invention as depicted in FIG. 8, conductive brushes 92 protruding from the case 14 can constantly transfer electricity to a rotating conductive ring plate 94 attached to the spool 18. The conductive brushes 92 being made of brass or other conductive material wherein the assembly (which may be a slip ring design) transfers electricity from the first electric cord 20 to the second electric cord 28 through a housing 38 mounted to one of the first and second casing members 14, 16, to secure the cord 28 to said casing member.

All embodiments of the invention may have an automatic latch mechanism 80, as depicted in FIG. 3 and 8, wherein said latch 80 can include a spring loaded finger 82 mounted on the spool 18 and a ratchet element 84 mounted on the shaft 22. Furthermore, all embodiments of the invention can include a mount 86 (not entirely shown) to attach to the car's engine compartment 40, said mount 86 including a set of holes 88 (FIG. 7) which may be drilled in one said first or second casing members 14, 16 wherein mounting brackets (not shown) and carriage bolts (not shown) will be correspondingly secured through the set of holes 88. As an option, plug adapters (not shown) used to convert a male end 46 to another male end 46 and a female end 48 to another female end 48 may be employed for convenience.

The cord holder device 10 may be available in three different sizes according to three differently sized cords 20. The smallest-sized holding device 10 could contain a 15 foot, 18/3 SOJ type cord wherein the holding device 10 has a diameter of 6.5 inches and a width of 2.25 inches.

In use, the holder device 10 can be mounted near the automobile radiator or other such areas of the car's engine compartment 40, as shown in FIG. 1. Ideally, the holder device 10 may be mounted inside the engine compartment 40 behind the grille next to the radiator and plugged into the engine heater with the automatic switch 26 detachably secured to the female end 48 of the electric cord 20 or 28. In this manner, the user merely has to reach into the grille and pull out the male end 46 in order to plug it into the nearest available electrical outlet. Once the temperature drops to less than 32 degrees Fahrenheit, the electricity would automatically begin flowing through cord holder device 10. Should the user decide to use cord holder device 10 without concern as to the surrounding ambient temperature, all the user need do is detach the automatic switch 26 (or the embodiment wherein the automatic switch 26 is fixed, all the user need do is move the lever 70 of the manual switch 68). In this manner, the user has a ready supply of electricity as may be needed to power any appliance, such as a light 90 as shown in FIG. 1, requiring 120 volts or the like conveniently located within the car's engine compartment 40.

As soon as the user is through using the cord holder device 10 and decides to unplug the male end 4 6 from the electrical outlet, the user merely has to gently pull the cord 20 away from the case 12 and let go, whereby the automatic latch mechanism 80 acts as an adjustable cord stop and releases the cord 20 in order for it to automatically rewind back onto the spool 18.

It is to be understood that the present invention is not limited to the embodiments described above, but encompasses any and all embodiments within the scope of the following claims.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will eventually be presented.

Equivalent, broader, and more generic terms are implicit in the prior description of each element as well. Such terms can be substituted where desired to make explicit the implicitly broad coverage to which this invention is entitled. As can be seen, in many instances the invention has been described through terminology listing various elements. Broad interpretations consistent with those elements which simply effect the desired end should be understood. Further, it should be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Also, the application should be understood to support eventual claiming of at least: i) a supply device as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, and vii) the various combinations and permutations of each of the above.

I claim:

1. An external electric supply to be mounted proximate to an engine, comprising:
   a. a first and second housing for retractably containing an electric cord having opposing ends, said first and second housing defining an opening;
   b. a reel shaft centrally located in said first and second housings;
   c. a plurality of plates secured to said reel shaft;
   d. a spool protruding from said plate wherein said electric cord is wrapped about said spool;
   e. a spring wrapped about said shaft for biasing said shaft in a direction which keeps said electric cord wrapped about said spool,
      whereby one end of said electric cord can be retractable pulled through said opening and plugged into an electrical outlet in order to provide electricity at the other end of said electrical cord, and whereby said electric cord, after being unplugged from said electrical outlet, is rewrapped about said collector spool; and
   f. an automatic switch which is configured to allow electricity to flow through both ends of said electric cord when an engine compartment in which said engine is located has an ambient temperature less than a predetermined temperature set through the automatic switch.

2. A external electric supply as defined in claim 1, wherein said automatic switch is detachably secured to one end of said electric cord.

3. A external electric supply as defined in claim 1, wherein said automatic switch comprises a bimetallic switch.

4. An external electric supply to be mounted proximate to an engine, comprising:
   a. a first and second housing for retractably containing an electric cord having opposing ends, said first and second housing defining an opening;
   b. a reel shaft centrally located in said first and second housings;
   c. a plurality of plates secured to said reel shaft;
   d. a spool protruding from said plate wherein said electric cord is wrapped about said spool;
   e. a spring wrapped about said shaft for biasing said shaft in a direction which keeps said electric cord wrapped about said spool,
      whereby one end of said electric cord can be retractably pulled through said opening and plugged into an electrical outlet in order to provide electricity at the other end of said electrical cord, and whereby said electric cord, after being unplugged from said electrical outlet, is rewrapped about said collector spool; and
   f. a dust bushing proximate to said opening which acts to clean said cord while being rewrapped.

5. An external electric supply to be mounted proximate to an engine comprising:
   a. a first and second housing for retractably containing an electric cord having opposing ends, said first and second housing defining an opening;
   b. a reel shaft centrally located in said first and second housings;
   c. a plurality of plates secured to said reel shaft;
   d. a spool protruding from said plate wherein said electric cord is wrapped about said spool;
   e. a spring wrapped about said shaft for biasing said shaft in a direction which keeps said electric cord wrapped about said spool,
      whereby one end of said electric cord can be retractably pulled through said opening and plugged into an electrical outlet in order to provide electricity at the other end of said electrical cord, and whereby said electric cord, after being unplugged from said electrical outlet, is rewrapped about said collector spool; and
   wherein said case is annular shaped with a protruding neck region, said neck region defining said opening and surrounded by a dust bushing, whereby said first electric cord is cleaned by said dust bushing while passing through said opening.

6. An electric cord holder device to be mounted proximate to an engine comprising:
   a. a case;
   b. a spool rotatably disposed within said case for holding a first electric cord;
   c. a connector which electrically connects said first electric cord to a second electric cord, said second electric cord being designed to function as an electrical outlet;
   d. an automatic switch which allows electricity to flow from said first electric cord to said second electric cord when an engine compartment has an ambient temperature less than a predetermined temperature set through the automatic switch; and
   e. a manual switch which allows electricity to flow from said first electric cord to said second electric cord when said engine compartment has an ambient temperature greater than said predetermined temperature, and whereby said second electric cord is capable of functioning as an electrical outlet when electricity is allowed to flow from said first electric cord to said second electric cord.

7. A external electric supply as defined in claim 6 wherein said first electric cord has opposing ends, one of said opposing ends including a power indicator which indicates when electricity is flowing through said first electric cord.

8. A external electric supply as defined in claim 6 wherein said case has a top and a bottom portion, said bottom portion having a weep hole.

9. A external electric supply as defined in claim 6, wherein said automatic switch comprises a thermometer element and wherein said manual switch comprises a lever.

10. A external electric supply as defined in claim 6, wherein said manual switch comprises a lever manipulatable from outside said case by a user.

11. A external electric supply as defined in claim 6 wherein said case is annular shaped with a protruding neck region, said neck region defining an opening surrounded by a dust bushing, whereby said first electric cord is cleaned by said dust bushing while passing through said opening.

12. A external electric supply as defined in claim 6, further comprising a spring for rotating said spool, whereby said first electric cord is retractably held about said spool by said spring.

13. A external electric supply as defined in claim 6, further comprising an automatic latch mechanism, whereby a user may pull said electric cord away from said case and said spool can temporarily lock into place until the user so decides to pull said cord once again in order to automatically retract said cord about said spool.

14. A external electric supply as defined in claim 6 wherein said connector for said first electric cord to said second electric cord includes a cooperative pair of conductive rings.

15. A external electric supply as defined in claim 14, wherein said conductive rings are made of brass.

16. A external electric supply as defined in claim 14 wherein said connector for said first electric cord to said second electric cord includes a cooperative pair of brushes in constant rotatable contact about said spool.

17. A external electric supply as defined in claim 6, further comprising plug adapters.

18. A method of providing an external electric supply proximate to an engine compartment, comprising the steps of:
   a. establishing a housing containing an electric cord proximate to said engine compartment;
   b. extending a first end of said electric cord from said housing outside of said engine compartment;
   c. retractably extending said first end of said electric cord from said engine compartment;
   d. connecting said first end of said electric cord to a line voltage electrical source external to said engine compartment;
   e. establishing a rotatable electrical connection within said housing;
   f automatically switching to allow electricity to flow through the entire electric cord when said engine compartment has an ambient temperature below a predetermined temperature; and
   g. creating a source of line voltage electricity within said engine compartment.

19. A method of providing an external electric supply to an engine compartment as described in claim 18 and further comprising the step of switching to disable the step of automatically switching to allow electricity to flow through said electric cord when said engine compartment has an ambient temperature below a predetermined temperature so that said electricity is permitted to flow through said electric cord when said engine compartment has an ambient temperature greater than said predetermined temperature.

* * * * *